United States Patent
Lakhanpal et al.

(10) Patent No.: US 7,254,115 B1
(45) Date of Patent: Aug. 7, 2007

(54) SPLIT-TRANSACTION BUS INTELLIGENT LOGIC ANALYSIS TOOL

(75) Inventors: Sanjiv K. Lakhanpal, Austin, TX (US); Steven R. Klassen, Austin, TX (US); Mark D. Nicol, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1076 days.

(21) Appl. No.: 10/229,639

(22) Filed: Aug. 28, 2002

(51) Int. Cl.
*H04L 12/28* (2006.01)
*H04J 3/06* (2006.01)
*G06F 15/173* (2006.01)
*G06F 13/00* (2006.01)

(52) U.S. Cl. .................. 370/257; 370/498; 370/503; 370/510; 370/512; 709/238; 710/107

(58) Field of Classification Search ............... 370/253, 370/278, 286, 301–304, 324, 502–513, 489; 710/107; 709/238
See application file for complete search history.

(56) References Cited

U.S. PATENT DOCUMENTS

| | | | | |
|---|---|---|---|---|
| 5,956,476 A | * | 9/1999 | Ranson et al. ............... 714/30 |
| 5,978,874 A | * | 11/1999 | Singhal et al. ............. 710/107 |
| 6,032,231 A | * | 2/2000 | Gujral ....................... 711/145 |
| 6,427,173 B1 | * | 7/2002 | Boucher et al. ............ 709/238 |
| 6,460,148 B2 | * | 10/2002 | Veenstra et al. .............. 714/39 |
| 6,507,923 B1 | * | 1/2003 | Wall et al. .................. 714/712 |
| 6,564,265 B2 | * | 5/2003 | Tillmann et al. ........... 709/246 |
| 6,789,217 B2 | * | 9/2004 | Slaugh et al. ................. 714/39 |
| 6,807,581 B1 | * | 10/2004 | Starr et al. .................. 709/250 |
| 6,813,251 B1 | * | 11/2004 | Garney et al. .............. 370/257 |
| 6,820,165 B2 | | 11/2004 | Pannell |
| 6,850,852 B1 | * | 2/2005 | Ferguson et al. ............. 702/67 |
| 7,093,236 B2 | * | 8/2006 | Swaine et al. .............. 717/128 |
| 2002/0091977 A1 | * | 7/2002 | Mastro et al. .............. 714/712 |
| 2002/0133588 A1 | * | 9/2002 | Doyle et al. ................ 709/224 |
| 2002/0161989 A1 | * | 10/2002 | Swaine ........................ 712/227 |
| 2004/0023616 A1 | * | 2/2004 | Straub et al. .............. 455/3.05 |
| 2004/0037313 A1 | | 2/2004 | Gulati et al. |
| 2004/0083299 A1 | | 4/2004 | Dietz et al. |

OTHER PUBLICATIONS

U.S. Appl. No. 10/229,583, filed Aug. 28, 2002, entitled "Split-Transaction Bus Decoder," naming inventors Sanjiv K. Lakhanpal, Steven R. Klassen and Mark D. Nicol; pp. 1-55.

"HyperTransport™ I/O Link Specification", Revision 1.03, Oct. 10, 2001, HyperTransport Technology Consortium; pp. 1-217.

* cited by examiner

*Primary Examiner*—Wing Chan
*Assistant Examiner*—Venkatesh Haliyur
(74) *Attorney, Agent, or Firm*—Zagorin O'Brien Graham LLP

(57) ABSTRACT

An improved split-transaction bus intelligent logic analysis tool has a bus synchronizer, a decoder and a logic analysis function. The bus synchronizer is configured to receive link traffic and frame the link traffic into a plurality of framed packets, the plurality of framed packets including a plurality of request packets and a plurality of response packets. The decoder is configured to receive the plurality of framed packets and decode the plurality of framed packets into decoded packets, wherein at least one of the decoded packets includes information from a request packet and information from a corresponding response packet. The logic analysis function is configured to receive the decoded packets and initiate a trigger action on receipt of one of the decoded packets.

28 Claims, 20 Drawing Sheets

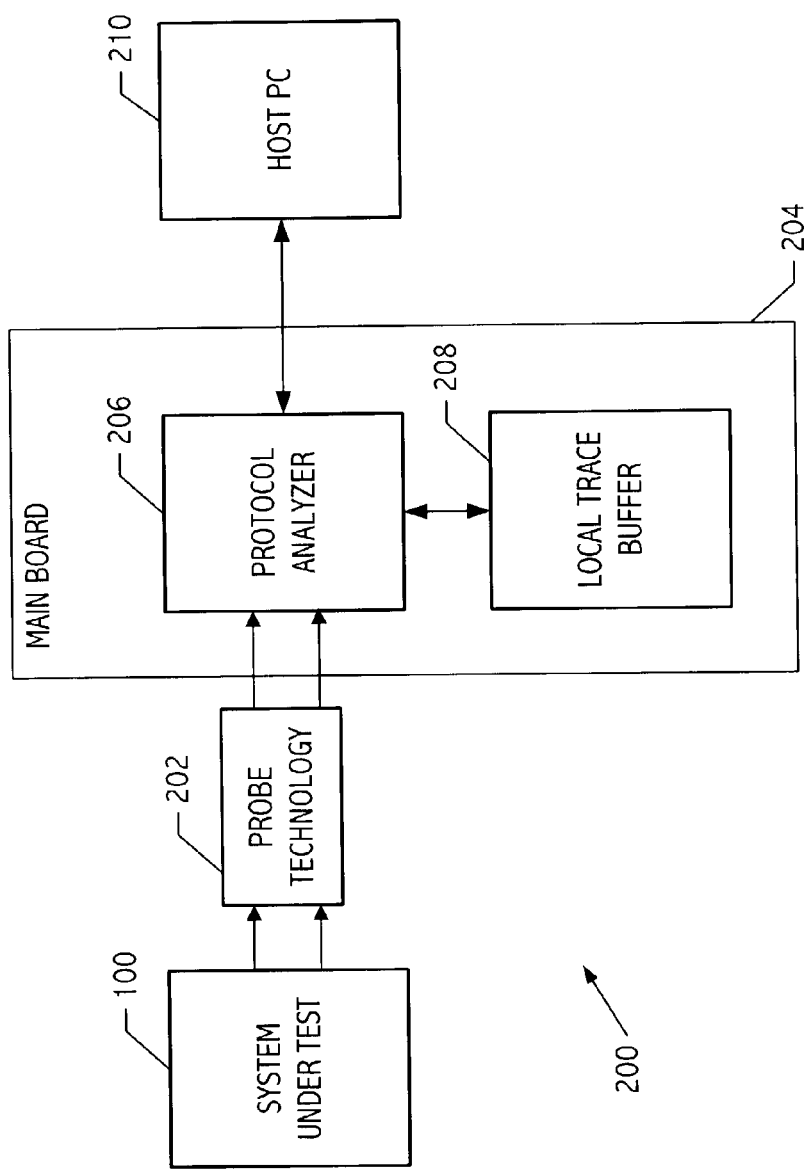

```
/* cmd packet and not end of previous command packet */
wire wCmdStartLow = ~dCmdPrevious & wCmdPktLow;

/* cmd packet & lower DW is end of previous cmd, data, or 1 DW cmd packet */
wire wCmdStartUp = (~(dCmdPrevious ^ wCmdPktLow) | (wCmdPktLow & ~wCmdSizeLow)) & wCmdPktUp;

/* valid if not Nop, end of a command packet, or data packet */
wire wCmdPrevious = (wCmdStartLow & wCmdSizeLow & ~wCmdPktUp) |
                    (dCmdPrevious & ~wCmdPktLow & ~wCmdPktUp) |
                    (wCmdStartUp & wCmdSizeUp);

always @(posedge clk or posedge rst or negedge HTrst)
  begin
    if (rst)
      dCmdPrevious <= #delay `FALSE;
    else if (~HTrst)
      dCmdPrevious <= #delay `FALSE;
    else if (dCadUpVal)
      dCmdPrevious <= #delay wCmdPrevious;
  end
```

FIG. 6

```
wire #delay wCADValidLow = (~dCmdPrevious & ~wNopLow) | ~(dCmdPrevious ^ wCmdPktLow);
wire #delay wCADValidUp = (~wCmdPktUp & (~(dCmdPrevious ^ wCmdPktLow) | (wCmdPktLow & ~wCmdSizeLow))) |
      (wCmdPktUp & (~wNopUp | (dCmdPrevious & ~wCmdPktLow) |
      (~dCmdPrevious & wCmdPktLow & wCmdSizeLow)));
```

FIG. 7

```
module addrcell (
            clk,
    rst,
            HTrst,
            iRdAddrStrobe,
    iRdAddrStore,
    iRdAddr,
    iRdTag,
    iRspAddrLkUp,
            iCancelAddr,
    iRspTag,
            iAcroTag,
    oRspAddr,
            owCellValid
            );

/* delay parameter */
parameter delay = 1;

/* input declarations */
input       clk;            // internal clock
input       rst;            // global reset
input       HTrst;          // HTRst# input       iRdAddrStrobe;  // indicates globally if a store is happening
input       iRdAddrStore;   // Write Strobe for address storage input [42:0] iRdAddr;
input [9:0]  iRdTag;        // Read Command Tag
input        iRspAddrLkUp;  // Response Address check strobe
input [9:0]  iRspTag;       // Response Command Tag
```

FIG. 10A

```
/* output declarations */ output [43:0]  oRspAddr;      // Response Address
output         owCellValid;   // Cell valid bit /* registers */ reg  [43:0]  dAddrCell;
reg  [9:0]   dCellTag;
reg          dRdMatch;
reg          dRspVal;
reg          dInvdRspHit;

/* indicates cell contains valid data */
wire    owCellValid  = dAddrCell0[43];
wire    iRdAddrStore;

/*
  If a RdTag match happens on a store to another cell, invalidate cell to ensure no
  duplicate tags - generally indicates error condition
*/
wire    wRdMatch    = ({iRdTag,iRdAddrStrobe,iRdAddrStore} == {dCellTag0,2'b10});

/* check for a lookup hit */
wire    wRspTagMatch = (iRspTag==dCellTag) & iRspAddrLkUp;
```

FIG. 10B

```
/* register results of Read Tag and Response Tag Compares */
always @(posedge clk or posedge rst or negedge HTrst)
  begin
    if (rst)
      begin
        dRdMatch   <= #delay `FALSE;
        dRspVal    <= #delay `FALSE;
      end
    else if (~HTrst)
      begin
        dRdMatch   <= #delay `FALSE;
        dRspVal    <= #delay `FALSE;
      end
    else
      begin
        dRdMatch   <= #delay wRdMatch;
        dRspVal    <= #delay wRspTagMatch;
      end
  end /* invalidate cell if Response or Read Tag hit */
wire wInvldCell = (dRspVal | dRdMatch) & owCellValid;

/* Set / Invalidate Address Cell Valid Bit (bit 43) */
  always @(posedge clk or posedge rst or negedge HTrst)
    begin
      if (rst)
        dAddrCell[43] <= #delay `FALSE;
      else if (~HTrst)
        dAddrCell[43] <= #delay `FALSE;
      else if (wInvldCell)
        dAddrCell[43] <= #delay `FALSE;
      else if (iRdAddrStore & iRdAddrStrobe)
        dAddrCell[43] <= #delay `TRUE;
    end
```

FIG. 10C

```
/* Store Address Cell Data */
always @(posedge clk or posedge rst or negedge HTrst)
  begin
    if (rst)
      begin
        dAddrCell[42:0] <= #delay 43'b0;
        dCellTag        <= #delay 10'h3ff;
      end
    else if (~HTrst)
      begin
        dAddrCell[42:0] <= #delay 43'b0;
        dCellTag        <= #delay 10'h3ff;
      end
    else if (iRdAddrStore & iRdAddrStrobe)    // store address and tag
      begin
        dAddrCell[42:0] <= #delay iRdAddr;
        dCellTag        <= #delay iRdTag;
      end
  end /* generate module output for Address Accumulator */
wire [43:0] oRspAddr = {dRspVal,dAddrCell[42:0]};

endmodule
```

FIG. 10D

HT Info Packet

| [63:27] | [26] | [25] | [24:21] | [20:13] | [12] | [11:8] | [7:0] |
|---|---|---|---|---|---|---|---|
| Time Stamp[36:0] | Trigger Position 1 = trigger valid | Link-B Packet Def | Link B Decode | Link B Qualifier | Link-A Packet Def | Link A Decode | Link A Qualifier |
| | | 0 = Data | Data Addr[5:2] | Data Byte Enables[7:0] | 0 = Data | Data Addr[5:2] | Data Byte Enables[7:0] |
| | | 1 = Command | ANA bit side-band only HTStop_L HTReq_L | Time Stamp[42:37] AND (IF RESPONSE PKT: Response Address[7:6] OR IF SIDE-BAND ONLY: HTReset_L Power OK) | 1 = Command | ANA bit side-band only HTReset_L Power OK | Time Stamp[42:37] AND (IF RESPONSE PKT: Response Address[7:6] OR IF SIDE-BAND ONLY: HTStop_L HTReq_L) |

CAD A Packet

| [63:32] | [31:0] |
|---|---|
| HT Upper DW Data[31:0] | HT Lower DW Data[31:0] |
| HT Command Address[39:8] | HT CAD Command[31:0] |
| HT CAD Command[31:0] | |

CAD B Packet

| [63:32] | [31:0] |
|---|---|
| HT Upper DW Data[31:0] | HT Lower DW Data[31:0] |
| HT Command Address[39:8] | HT CAD Command[31:0] |
| HT CAD Command[31:0] | |

| HT Packet |  |  |
|---|---|---|
| HT Command[30:0] | Address[39:2] | Data[63:0] Byte Enables[7:0] |

FIG. 14B

| 30 | 29 | 28 | 27 | 26 | 25 | 24 | 23:20 | 19:15 | 14:10 | 9:6 | 5:0 |
|---|---|---|---|---|---|---|---|---|---|---|---|
| Valid | ANA | NXA | Isoc | Bridge | Compat / Error | Pass PW | SeqID [3:0] | SrcTag [4:0] | UnitID [4:0] | Mask / Count [3:0] | Cmd [5:0] |

FIG. 14C

| 30 | 29 | 28 | 27 | 26:25 | 24:20 | 19:15 | 14:10 | 9:8 | 7:6 | 5:0 |
|---|---|---|---|---|---|---|---|---|---|---|
| Valid | DisCon | Isoc | rsv | Response [1:0] | Response Data [4:0] | Post Data [4:0] | NonPost Data [4:0] | Post Cmd [1:0] | Non Post Cmd [1:0] | Cmd [5:0] |

SPLIT-TRANSACTION BUS INTELLIGENT LOGIC ANALYSIS TOOL

CROSS-REFERENCE TO RELATED APPLICATION(S)

This application is related to U.S. patent application Ser. No. 10/229,583 entitled "SPLIT-TRANSACTION BUS DECODER," naming Sanjiv K. Lakhanpal, Steven R. Klassen, and Mark D. Nicol as co-inventors, and filed on Aug. 28, 2002. The related application is incorporated herein by reference in its entirety.

BACKGROUND

1. Field of the Invention

This invention relates to tools for analysis of electronic circuits and more particularly to an intelligent analysis tool that interprets bus protocols and associates request packets and response packets on a split-transaction bus.

2. Description of the Related Art

Logic analyzers have been used for years to help debug and evaluate electronic circuits. Typically, probes or connectors are attached to signals on an electronic circuit, for example, a printed circuit board (PCB). The activities of the signals are monitored and displayed on a logic analyzer's screen or computer screen as waveforms and/or as logic levels. A user interface is typically used to define signal names with the option of grouping and displaying signals as a bus. A logic analyzer can provide features such as triggering on the occurrence of certain logic levels of the signals, the occurrence of bus transactions such as a write operation to a specific address and other such things. Upon the occurrence of a trigger condition, an amount of the signals' activities are stored and displayed on a display screen for interpretation by the user. The user can spend many hours manually deciphering data and waveforms.

For very complex busses, instead of manually deciphering the bus and its transactions, another technique can be used. For example, after a trigger condition a logic analyzer can store all bus signal activity in memory for a specific amount of time. Then, a software tool is used to post-process the data. For example, the software tool can group the signal transitions into bus transactions and present a display or printout of the signal activities in a more complex and comprehensive form. However, because the data is stored and later post-processed, the analysis is not a real time solution and typically doesn't allow real-time triggering on complex events.

Some logic analyzers do provide bus support, for example, a logic analyzer can provide support for a specific bus, for example, the PCI bus. Signal naming and grouping can be automated, probes are specific to the particular type of bus, protocol decoding can be provided, and bus-specific triggering can be provided. However, these logic analyzers typically only monitor a bus and decode the signals according to the bus protocol, for example, converting a 32-bit value into a command or address.

While providing this type of specific bus support is valuable and makes analysis of an electronic circuit easier, more complicated busses and transactions are not supported. For example, support for a split-transaction bus, in which responses are separate from a corresponding request, requires more sophisticated analysis. A traditional logic analyzer probing a split-transaction bus, for example, a HyperTransport™ (HT) link, has no straightforward way to trigger on a read request and its associated response. The traditional logic analysis method would buffer the split-transaction bus traffic and then post-process the buffered data to identify the desired packets. Additionally, if the split-transaction bus uses an address in a request packet, and uses a tag instead of the address in a response packet, address translation is required. Post-processing is typically used to analyze a split-transaction bus. However, this does not provide real time analysis capability and thus triggering on specific events is unavailable.

As busses become more complex and high-speed, a real-time intelligent protocol analyzer tool is needed.

SUMMARY

Accordingly, in one embodiment, an improved protocol analyzer tool and method has a bus synchronizer, a decoder and a logic analysis function. The bus synchronizer is configured to receive link traffic and frame the link traffic into a plurality of framed packets, the plurality of framed packets including a plurality of request packets and a plurality of response packets. The decoder is configured to receive the plurality of framed packets and decode them into decoded packets, wherein at least one of the decoded packets includes information from a request packet and information from a corresponding response packet. The logic analysis function is configured to receive the decoded packets and initiate a trigger action on receipt of one of the decoded packets. Thus, the request packets and corresponding response packets are decoded for logic analysis providing efficient triggering capability.

In one embodiment, a protocol analyzer is implemented as a set of software instructions stored on computer readable media. Thus, the protocol analyzer can be an element in a library of parts provided by an integrated circuit design tool and utilized in the design or simulation of integrated circuits.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 2 illustrates an exemplary architecture of a protocol intelligent logic analysis tool according to an embodiment of the present invention.

FIG. 6 illustrates exemplary verilog RTL code for applying command start pre-decode information to HT link CAD packets by utilizing pervious pre-decode information according to an embodiment of the present invention.

FIG. 7 illustrates exemplary verilog RTL code performing an HT link filtering mechanism according to an embodiment of the present invention.

FIGS. 10A-10D illustrate exemplary verilog RTL code for each address cell 904 according to an embodiment of the present invention.

FIGS. 11A-11C illustrate an exemplary HT link specific storage format according to an embodiment of the present invention.

FIGS. 14A-14C illustrate an exemplary HT link specific triggering format according to an embodiment of the present invention.

The use of the same reference symbols in different drawings indicates similar or identical items.

DESCRIPTION OF THE PREFERRED EMBODIMENT(S)

Figure 1A:
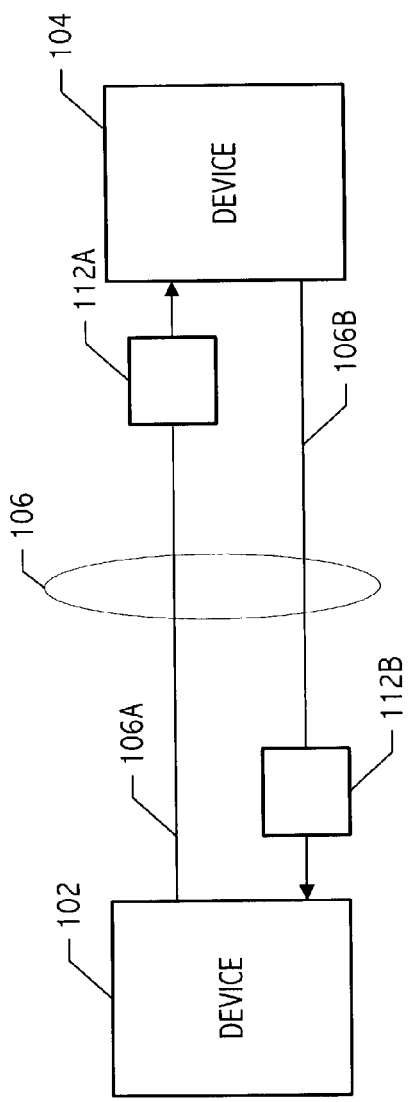
FIGS. 1A-1C illustrate an exemplary system 100 including a split-transaction bus.

FIG. 1A illustrates an exemplary system 100 including a split-transaction bus. A device 102 is coupled to a device 104 via a split-transaction bus 106. Split-transaction bus 106 includes a downstream data flow 106A, also referred to as link A, and an upstream data flow 106B, also referred to as link B. Probe connection points 112A and 112B are coupled to downstream data flow 106A and upstream data flow 106B, respectively. Probe connection points 112 can be, for example, inline with each link (as shown), or as a stub connection (not shown). Link signals typically include link traffic such as clock, control, command, address and data information and link sideband signals that qualify and synchronize the traffic flowing between device 102 and device 104.

According to one embodiment of the invention, device 102 can be a processor, for example, an AMD Opteron™ micro-processor, device 104 can be a bridging device, for example, an AMD 8111 HyperTransport™ (HT) IO Hub, and split-transaction bus 106 can be an HT split-transaction link. The HT link is a high-speed, high-performance, point-to-point link for inter-connecting integrated circuits on a board. The HT link has dual uni-directional point-to-point links. Link traffic can be two, four, eight, 16 or 32 bits wide. HT link signals use 1.2 volt low voltage differential signaling (LVDS). Sideband signals for an HT link include HTReset#, HTStop#, HTReq#, and PwrOK. PwrOK serves to qualify the other three sideband signals. For example, HTReset# cannot be sampled as active unless PwrOK is active as well. HTReset# and HTStop# initialize and synchronize the link. HTReset# serves to fully reset the HT link devices such that no previous state is saved and the system undergoes a full reset (warm or cold). HTStop#, when active, suspends the operation on a link, but does not reset any devices. HTStop# is used during power management and to modify link operation such as modifying link width and link frequency. HTReq# is optional and is used in conjunction with HTStop# to allow a device to wake up a link suspended by HTStop#.

Referring to FIG. 1A, directional arrows on each link, 106A and 106B, indicate the general direction of data flow. Each link can be composed of multiple signal traces, with information traveling in either direction. Although split-transaction bus 106 is illustrated as having two separate sets of signal traces, alternative embodiments of the present invention can utilize a single set of signal traces where packets of information from the two links are time-multiplexed.

Figure 1B:
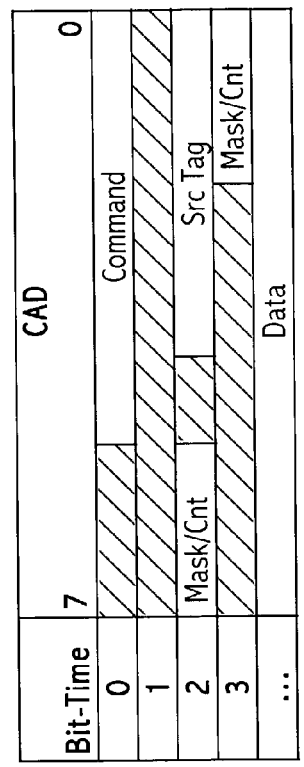
Figure 1C:
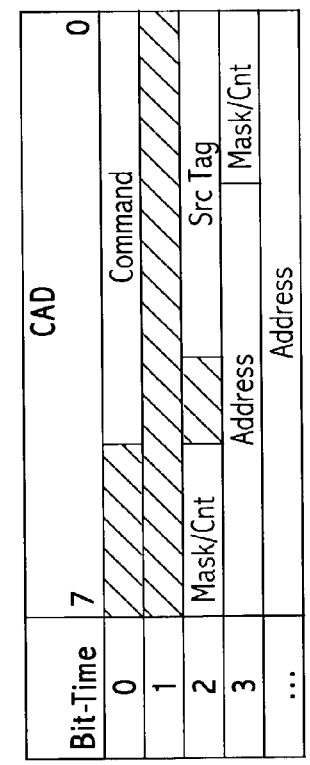

FIGS. 1B-1C illustrate two exemplary HT link packets. FIG. 1B illustrates a HT link read byte request transmitted, for example, on link 106A. FIG. 1C illustrates a HT link read response transmitted, for example, on link 106B. As illustrated, the read byte request is transmitted with a 40-bit address. The read response is transmitted at a later time including the requested data but no address. The read response instead is identified by a source tag. Further, multiple other packets can be transmitted on link 106B prior to the transmittal of the read response. For proper logic analysis of system 100, the read request must be associated with the proper read response such that the display can include the read request command, appropriate address and associated data.

FIG. 2 illustrates an exemplary architecture of a protocol intelligent logic analysis tool 200 for testing, for example, system 100, according to an embodiment of the present invention. Protocol intelligent logic analysis tool 200 provides the ability to synchronize and decode link traffic for analysis and triggering across multiple bit-times and to handle conditions inherent with a split-transaction protocol. For example, protocol intelligent logic analysis tool 200 associates request packet address information with the appropriate response packet and generates a complete triplet of command, address, and data information for all commands as appropriate to be utilized for logic-analysis and display.

Referring to FIG. 2, system 100 includes a split-transaction bus to be analyzed. As shown, probe technology 202 receives two data streams from system 100, one for each direction of split-transaction bus 106. Probe technology 202 monitors activities on split-transaction bus 106, converts the signals electrically into data streams as needed, and sends the data streams to a split-transaction bus analysis main board 204. Main board 204 includes a protocol analyzer 206 and a local trace buffer 208. A decoded output of protocol analyzer 206 is suitable for use by a logic analysis system and for display of a coherent and easily discerned view of link traffic in a system. Protocol analyzer 206 receives the two data streams from probe technology 202, one for each link, and performs protocol analysis on the data streams. For example, protocol analyzer 206 interprets bus transactions, matches requests and responses, translates any tags into addresses as needed, and formats output for easier display and analysis by a host PC 210. Protocol analyzer 206 can be, for example, implemented in reprogrammable FPGA technology. Protocol analyzer 206 is further described in relation to FIG. 3. Local trace buffer 208 stores trace information for display on Host PC 210 once trigger conditions have been met.

Main board 204 communicates with a host PC 210. Host PC 210 can be, for example, a standard personal computer system including protocol analysis software. Alternatively, host PC 210 can be a customized computing engine and display tool. Host PC 210 communicates with main board 204, for example, through a high-speed serial communication link with a host-side transceiver contained on, for example, a PCI card in host PC 210. Host PC 210 initializes main board 204, provides diagnostics, provides a user interface for the creation of triggers, downloads and enables triggers onto main board 204, monitors main board 204 to determine if a trigger condition has been met, if so, downloads trace information from local trace buffer 208, and displays trace information for purposes of analysis and debug.

Figure 3:
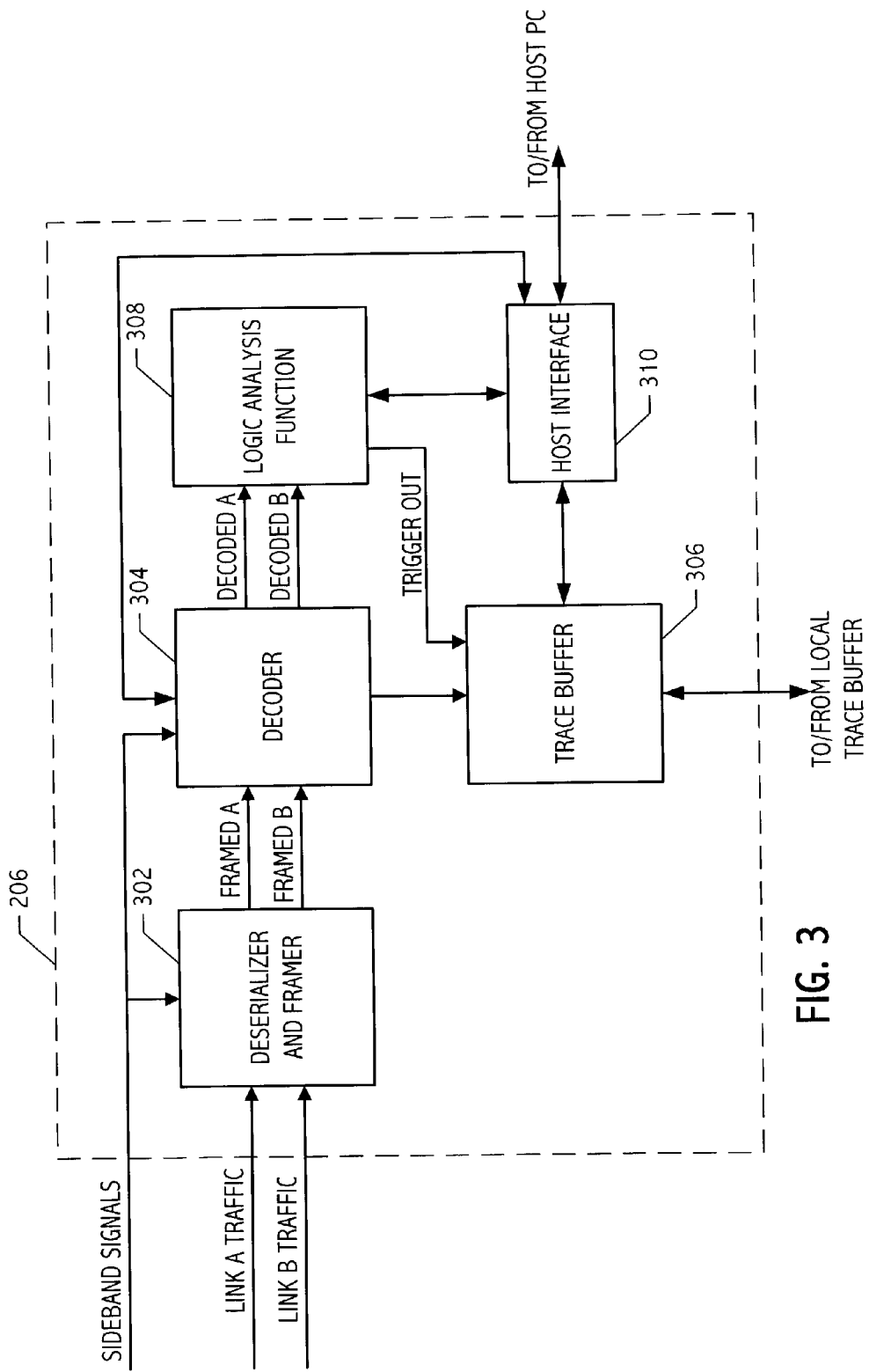
FIG. 3 illustrates functional blocks of protocol analyzer according to an embodiment of the present invention.

FIG. 3 illustrates functional blocks of protocol analyzer 206 according to an embodiment of the present invention. The decoded output from protocol analyzer 206 is suitable for use by a logic analysis system and for display of a coherent and easily discerned view of link traffic in a system.

A deserializer and framer 302 receives link data, including link A traffic, link B traffic, and sideband signals from probe technology 202. The framing function portion of deserializer and framer 302 synchronizes the link traffic according to the link or bus protocol. The deserializing function portion of deserializer and framer 302 deserializes the link traffic to allow the circuitry of protocol analyzer 206 to run at lower speeds, aligns sampled packets across, for example, four-bit time boundaries to allow for efficient decode of link traffic, and translates packet information to internal bus speeds and circuitry. An exemplary implementation of a deserializing function portion of deserializer and framer 302 is described in relation to FIGS. 4A-4B.

Decoder 304 receives deserialized and framed link traffic from deserializer and framer 302. Decoder 304 performs error checking of the link traffic, filters link traffic to remove null operations and error information, formats and sends trace information to trace buffer 306 for storage, decodes link traffic into command, address, and data triplets, and sends decoded link traffic to logic analysis function 308. Exemplary implementations of decoder 304 are described in relation to FIGS. 5A-10D according to embodiments of the present invention.

Decoder 304 produces decoded link packets in two formats, one for efficient storage of the data in trace buffer 306 and download to Host PC 210, and another for efficient use and triggering by logic analysis function 308. An exemplary HT link specific storage format is described in relation to FIGS. 11A-D. An exemplary HT link specific triggering format is described in relation to FIGS. 14A-14C. The triggering format presented to logic analysis function 308 is a command, address, and data triplet. The storage formatted presented to trace buffer 306 is decoded HT link traffic decomposed into Command/Address and Data pairs with additional information such as timestamp, sideband signal state, and the like. Alternative storage and triggering formats can be utilized in accordance with embodiments of the present invention. For example, the triggering format presented to logic analysis function 308 can be used to derive the storage format presented to trace buffer 306.

Trace buffer 306 stores trace information from decoder 304 to local trace buffer 208. Upon receipt of a trigger event from logic analysis function 308 indicating that a trigger condition has been met, trace buffer 306 determines how much post-trigger traffic to store. Trace buffer 306 transmits trace information with relevant trigger information to host interface 310 for transmission to Host PC 210 for display and any desired post-processing. An alternate embodiment of trace buffer 306 allows a user to selectively store packets such as only storing accesses to particular addresses, particular command types, certain data patterns, or any of these combined.

Logic analysis function 308 receives decoded link traffic from decoder 304. Logic analysis function 308 contains programmable functions designed to support multi-state complex triggers. Logic analysis function 308 supports triggering on any field of the command, address, and data triplet received from decoder 304. Logic analysis function 308 contains compound triggering capabilities similar to that of a conventional logic analyzer. A HT link specific implementation of logic analysis function 308 is described in relation to FIGS. 12-13.

Host interface 310 is, for example, a high speed, full-duplex, serial interface used to interface to host PC 210. Host interface 310 is a programming interface for Host PC 210 to configure internal registers of main board 204 including configuring trigger information in logic analysis function 308. In addition, as mentioned above, host interface 310 receives trace data from trace buffer 306 and sends the trace data to host PC 210.

HT Link Deserializing Function

Figure 4A:
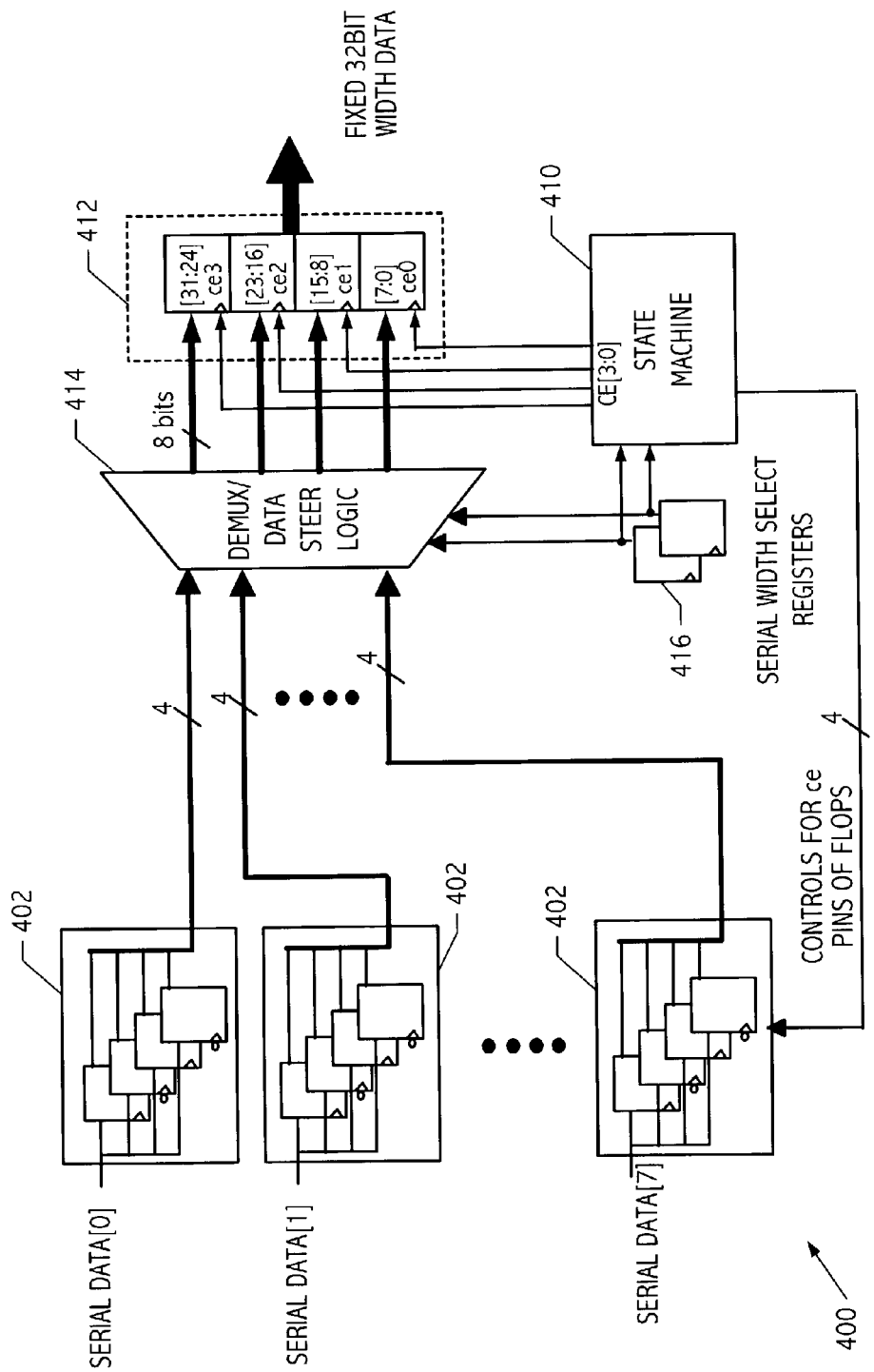
FIGS. 4A and 4B illustrate a HyperTransport™ (HT) link implementation of a deserializing function of a deserializer and framer according to an embodiment of the present invention.
Figure 4B:
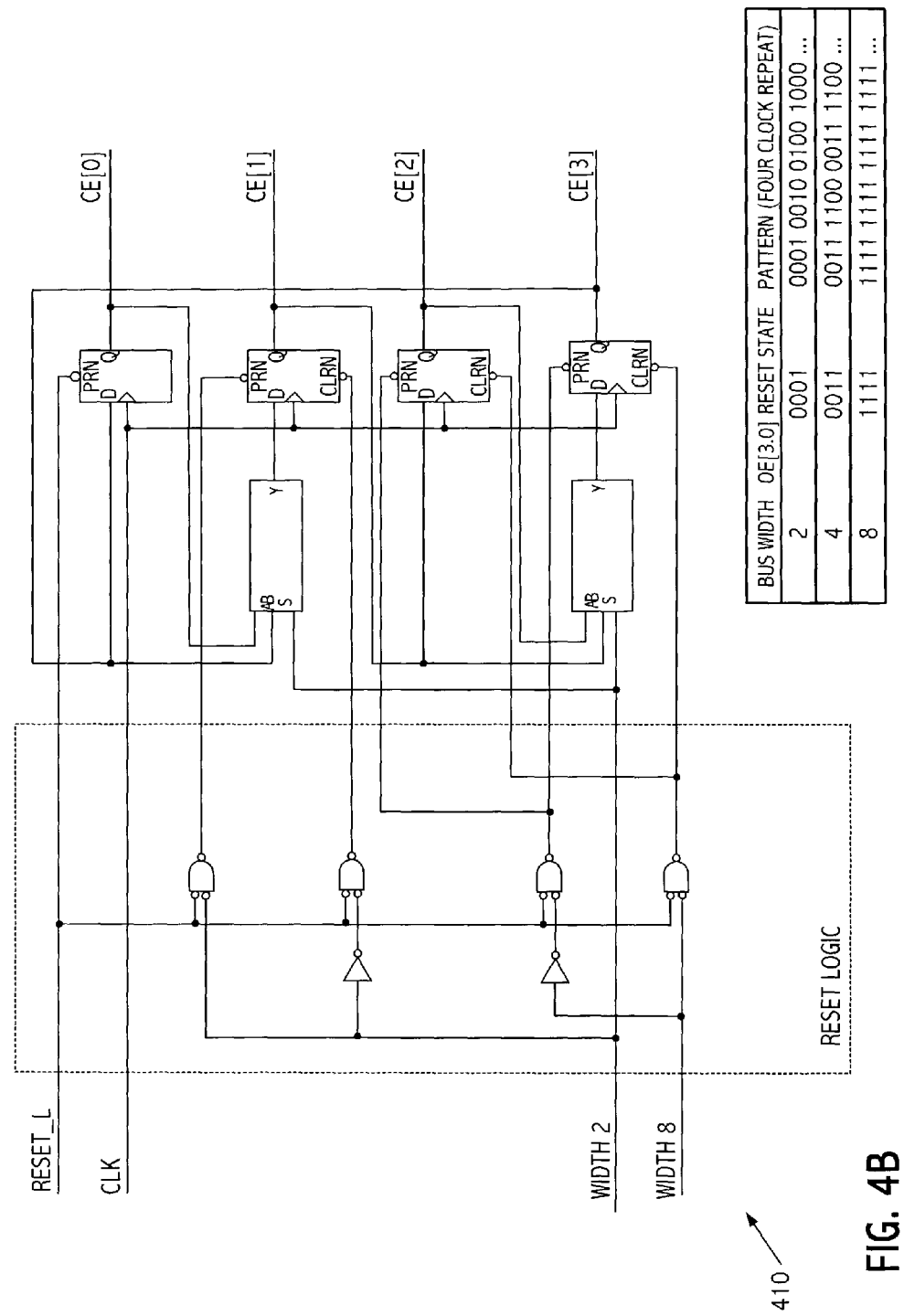

FIGS. 4A-4B illustrate a HT link implementation of a deserializing function 400 of deserializer and framer 302 according to an embodiment of the present invention. The HT link is adjustable in width (i.e. from two to 32 bits). In order to monitor the HT link with a logic analysis system, deserializing function 400 must have the ability to configure the serial to parallel conversion of HT link traffic being monitored to match the width of the targeted HT link. Without a method of configurable serial to parallel data conversion, three separate serial to parallel circuits would be needed to accomplish the same task. Deserializing function 400 adjusts the width of the serial to parallel circuit transforming a two, four, or eight bit HT link into a fixed width (32 bit) format according to an embodiment of the present invention.

Referring to FIG. 4A, serial data[7:0] enters eight sets of four flip flops 402 and is clocked into each set of four flip flops with four clock edges, controlled by a two bit counter within state machine 410. The clock edges for the eight sets of four flip flops 402 are enabled and disabled based upon the reset, synchronize and initialize protocol specified by the HT link specification. The receive logic is disabled for periods of time to eliminate spurious data sampling. The clocked data is routed to an accumulator 412 through demultiplexer 414 according to the value in width select registers 416. Width select registers 416 are configured during system initialization by host PC 210. A two-bit link takes four clocks to accumulate 32-bits of data, a four-bit link takes two clocks, and an eight-bit link takes 1 clock. A 16-bit link requires two accumulators working in parallel and 64-bits of data is sampled every clock. The clock enables CE[3:0] for accumulator 412 are used to accumulate 32-bits of HT link information before transmission to decode block 304. For example, in the case of a four-bit HT link, 16 bits of data is collected every clock (4 CAD bits multiplied by 4 bits of data per clock), thus two clocks are needed to collect the 32 bits of data. An exemplary embodiment of the CE[3:0] generation portion of state machine 410 is illustrated in FIG. 4B.

Note that deserializing function 400 is duplicated, one function for each link. Thus, two 32 bit deserialized data streams are produced. By generating a consistent 32-bit format for two, four, or eight bit HT links, decoder block 304 can be simplified by only having to handle a 32-bit CAD packet.

FIG. 4B illustrates an exemplary implementation of a CE[3:0] generation portion of state machine 410 utilized by deserializing function 400 of FIG. 4A according to an embodiment of the present invention. State machine 410 minimizes the combinatorial logic required for the clock enable generation function, and places this logic at the data inputs of the clock enable registers, thereby maximizing the speed at which state machine 410 and deserializing function 400 can operate.

HT Link Decoder

Figure 5A:
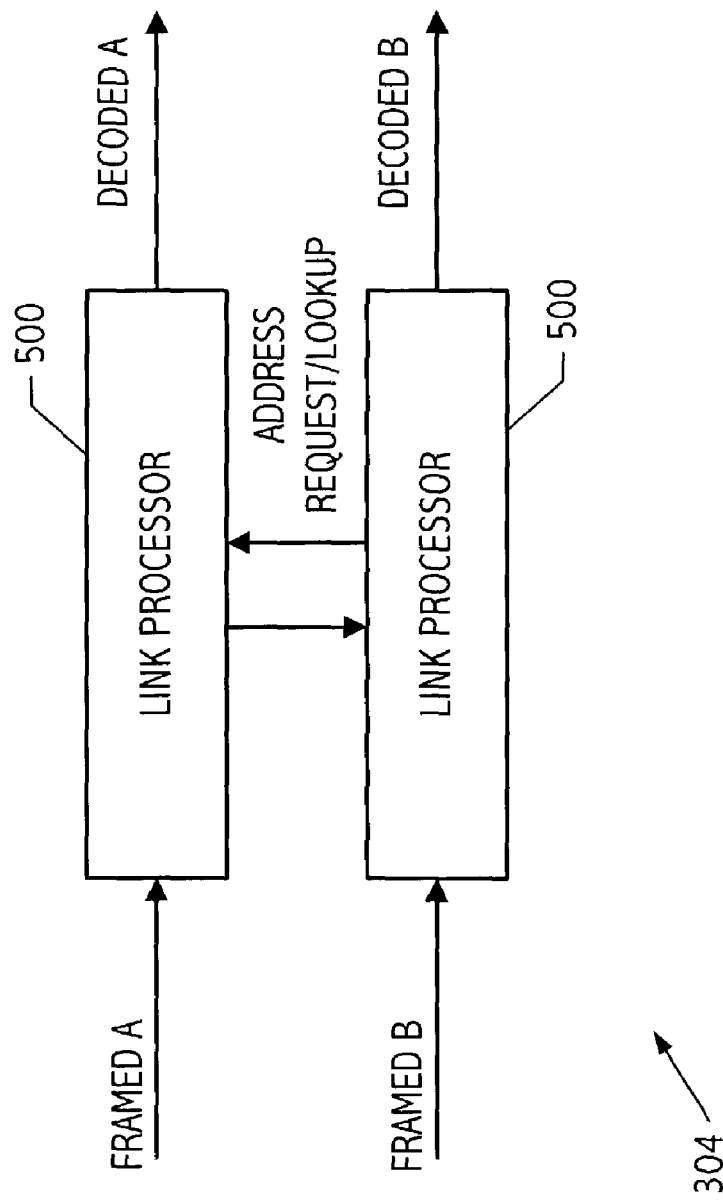
FIGS. 5A and 5B illustrate an exemplary HT link implementation of a decoder according to an embodiment of the present invention.
Figure 5B:
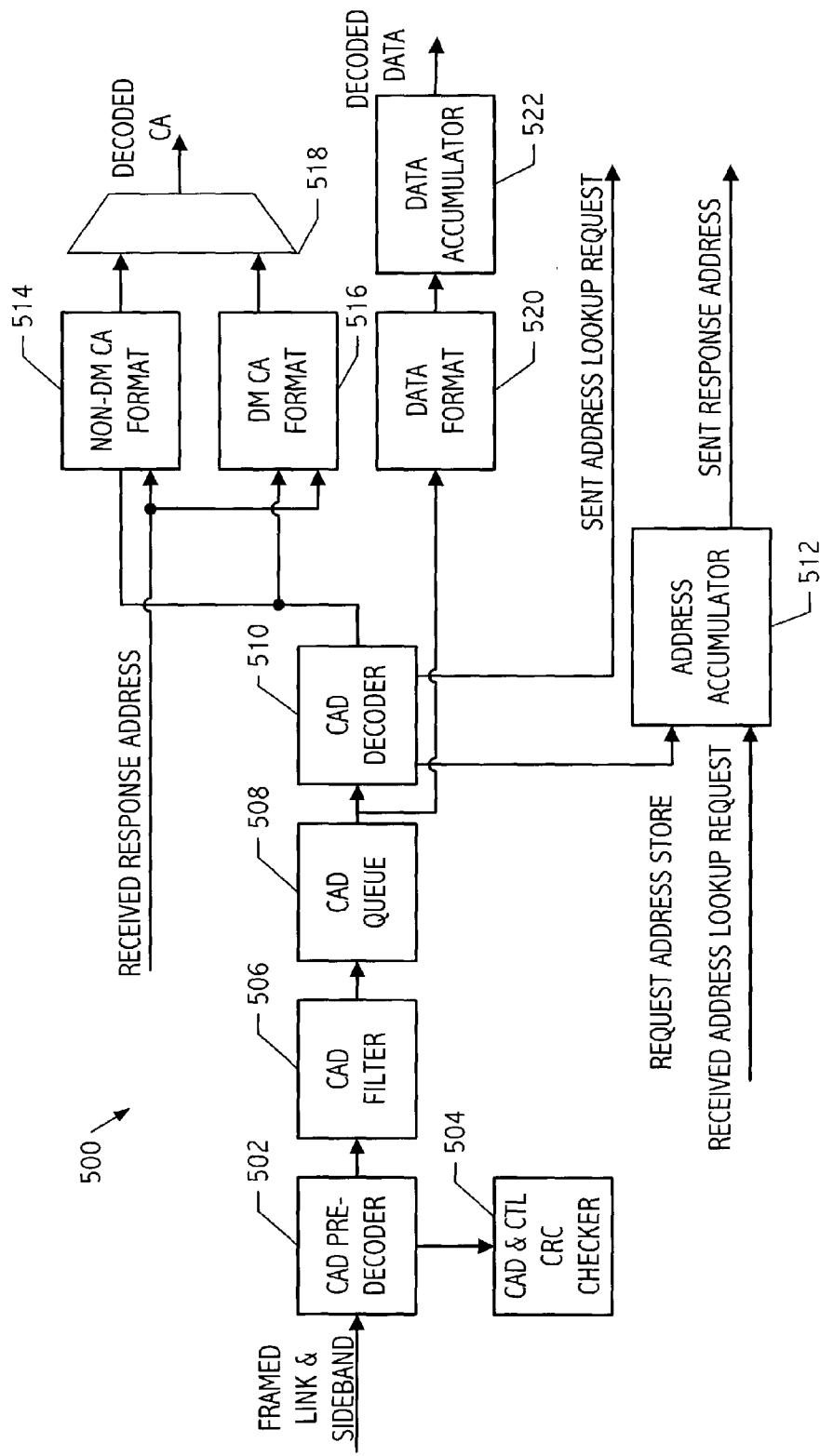

FIGS. 5A-5B illustrate an exemplary HT link implementation of decoder 304 according to an embodiment of the present invention. Referring to FIG. 5A, decoder 304 includes two identical link processors 500 that work in conjunction to decode link traffic in both directions. The two link processors 500 receive link traffic A and link traffic B, respectively. The two link processors exchange address lookup and request information to aid in the address/tag translation and matching response and request packets.

FIG. 5B illustrates an exemplary HT link implementation of link processor 500 according to an embodiment of the present invention. Link processor 500 produces an output format that associates a Command/Address/Data triplet for all HT link commands (as needed). When a response packet does not contain an address field and instead contains HT link tag information, link processor 500 retrieves associated address and data-type information stored in address accumulator 512 of the other link processor 500 using HT link tag information derived from the request packet. By associating actual addresses with response packets, logic analysis function 308 can be greatly simplified and end-user trigger statements made less complex. Logic analysis of a split-transaction bus can become decoupled from using pseudo-random tag information. In addition, the output format lends itself to easily supporting a logic analysis and display system. Link processor 500 formats data to be quad-word sized and generates a byte enable field to validate data across the quad-word because HT link data can be valid from a byte to quad-word interval. If the data size is known to be greater than a single double-word, link processor 500 accumulates data to be quad-word sized. Link processor also aligns data and addresses on a quad-word boundary to provide a consistent output that can be easily analyzed.

Referring to FIG. 5B, command, address and data (CAD) predecoder 502 receives framed link traffic (command, address, data and control traffic) from deserializer and framer 302, processes and applies predecode information to all CAD packets to facilitate decode. For example, during the decode process, particular packets such as true NOP (non-flowcontrol) and stall packets can be removed from the CAD stream and not placed in the HT link CAD queue for further processing. Further information on HT link specific predecode is provided below.

Link traffic from CAD pre-decoder 502 is received by a cyclic redundancy check (CRC) checker 504. CRC checker 504 performs an error detection check on link traffic to ensure that the decoded link information has been sampled correctly and ensure link signal integrity.

CAD filter 506 receives CAD packets with pre-decode information. CAD filter 506 removes all zero-NOP packets (i.e., flow control packets that are all zero's) and stall packets. Additional pre-decode information is added, including identifying the start and size of command and data packets. Further information on HT link specific filtering is provided below.

CAD queue 508 receives filtered CAD packets from CAD filter 506. CAD queue 508 is, for example, a four-entry circular queue structure designed to work with a CAD decoder 510 to allow CAD packets and associated pre-decode information to be accumulated before processing. CAD queue 508 generates additional pre-decode information, for example, to inform CAD decoder 510 when a complete valid command has been accumulated and is ready to be decoded.

CAD decoder 510, using pre-decode information, decodes command-address data received from CAD Queue 508 and routes decoded command and address information to either a non-data movement (DM) command-address (CA) format block 514 or a DM CA format block 516. The HT link protocol specifies that non-data movement command packets such as flow control commands, read commands, or target done commands can interrupt the transmission (i.e., be inserted within) a block of data packets being transmitted. For example, a 64-byte block of data associated with a "write double word" command (with a count=0xf) would flow on the HT link if uninterrupted as follows:

| Relative Bit-Time | Packet Description |
|---|---|
| 7-0 | Write DW command, count = 0xf, address = 0x000000F000 |
| 11-8 | 1st DW of Data = 0X11223344 |
| 15-12 | 2nd DW of Data = 0X55667788 |
| 19-16 | 3rd DW of Data = 0X99aabbcc |
| 23-20 | 4th DW of Data = 0Xddeeff00 |
| 27-24 | 5th DW of Data = 0X12121212 |
| 31-28 | 6th DW of Data = 0X34343434 |
| 35-32 | 7th DW of Data = 0X56565656 |
| 39-36 | 8th DW of Data = 0X78787878 |
| 43-40 | 9th DW of Data = 0X9a9a9a9a |
| 47-44 | 10th DW of Data = 0Xbcbcbcbc |
| 51-48 | 11th DW of Data = 0Xdededede |
| 55-52 | 12th DW of Data = 0Xf0f0f0f0 |
| 59-56 | 13th DW of Data = 0Xfedcba98 |
| 63-60 | 14th DW of Data = 0X76543210 |
| 67-64 | 15th DW of Data = 0x01234567 |
| 71-68 | 16th DW of Data = 0x89abcdef |

CAD decoder 510 generates the following:

| Command | Count | Address | Byte-Enables | Data |
|---|---|---|---|---|
| Write DW | 0xf | 0x000000F000 | 0xff | 0x1122334455667788 |
| Write DW | 0xf | 0x000000F008 | 0xff | 0x99aabbccddeeff00 |
| Write DW | 0xf | 0x000000F010 | 0xff | 0x1212121234343434 |
| Write DW | 0xf | 0x000000F018 | 0xff | 0x5656565678787878 |
| Write DW | 0xf | 0x000000F020 | 0xff | 0x9a9a9a9abcbcbcbc |
| Write DW | 0xf | 0x000000F028 | 0xff | 0xdededededf0f0f0f0 |
| Write DW | 0xf | 0x000000F030 | 0xff | 0xfedcba9876543210 |
| Write DW | 0xf | 0x000000F038 | 0xff | 0x0123456789abcdef |

However, the transmission of the data packets can be interrupted by a non-data movement command such as a read request command as follows:

| Relative Bit-Time | Packet Description |
| --- | --- |
| 7-0 | Write DW command, count = 0xf, address = 0x000000F000 |
| 11-8 | 1st DW of Data = 0X11223344 |
| 15-12 | 2nd DW of Data = 0X55667788 |
| 19-16 | 3rd DW of Data = 0X99aabbcc |
| 27-20 | Read DW request, count = 0x6, address = 0x00000aa100 |
| 31-28 | 4th DW of Data = 0Xddeeff00 |
| 35-32 | 5th DW of Data =0X12121212 |
| 39-36 | 6th DW of Data = 0X34343434 |
| 43-40 | 7th DW of Data = 0X56565656 |
| 47-44 | 8th DW of Data = 0X78787878 |
| 51-48 | 9th DW of Data = 0X9a9a9a9a |
| 55-52 | 10th DW of Data = 0Xbcbcbcbc |
| 59-56 | 11th DW of Data = 0Xdededede |
| 63-60 | 12th DW of Data = 0Xf0f0f0f0 |
| 67-64 | 13th DW of Data = 0Xfedcba98 |
| 71-68 | 14th DW of Data = 0X76543210 |
| 75-72 | 15th DW of Data = 0x01234567 |
| 79-76 | 16th DW of Data = 0x89abcdef |

CAD decoder 510 generates the following:

| Command | Count | Address | Byte-Enables | Data |
| --- | --- | --- | --- | --- |
| Write DW | 0xf | 0x000000F000 | 0xff | 0x1122334455667788 |
| Read DW | 0x6 | 0x00000aa100 | 0x00 | 0x0000000000000000 |
| Write DW | 0xf | 0x000000F008 | 0xff | 0x99aabbccddeeff00 |
| Write DW | 0xf | 0x000000F010 | 0xff | 0x1212121234343434 |
| Write DW | 0xf | 0x000000F018 | 0xff | 0x5656565678787878 |
| Write DW | 0xf | 0x000000F020 | 0xff | 0x9a9a9a9abcbcbcbc |
| Write DW | 0xf | 0x000000F028 | 0xff | 0xdededef0f0f0f0 |
| Write DW | 0xf | 0x000000F030 | 0xff | 0xfedcba9876543210 |
| Write DW | 0xf | 0x000000F038 | 0xff | 0x0123456789abcdef |

Thus, due to the possibility of insertion of non-data movement commands into data packets, two different decode paths are provided such that the non-data movement commands can be decoded and outputted while not destroying the current command, address and data information currently being decoded and processed for a data movement command. Multiplexer 518 routes the appropriate command/address information as needed.

Based upon predecode information, CAD decoder 510 stores request address and data-size information in address accumulator 512. CAD decoder 510 also initiates retrieval of address and data-size information from the address accumulator for use by DM CA format block 516 and non-DM CA format block 514. The dual CA format blocks handle non-DM commands and DM commands. Because data packets can be interrupted by non-DM commands flowing on an HT link, the dual command address architecture preserves the state of a data-movement command/address/data triplet in flight but not yet complete. Such an approach also reduces logic by optimizing for each case. Doing so eliminates the need for dual data processing pipes and replicating the logic needed to align and increment addresses since non-data movement commands do not need such resources.

Address accumulator 512 is, for example, a content-addressable memory array that holds and disperses relevant address and data-size information for use during decode of response packets. HT link response packets do not contain an explicit address transmitted on the link, but only an associated tag that couples the response to a request and in turn to a specific address. By storing request-packet address information and the command tag as an index, the address can be retrieved and integrated into the decoded output of the response packet. Note that the request is on a different link, for example, the downstream link, from the response which is on, for example, the upstream link. Thus, the two link processors 500 operate in conjunction to perform tag lookup and address retrieval functions. This operation is further described in relation to FIG. 8.

Non-DM command-address format block 514 accepts decoded command-address information from CAD decoder 510. For response commands, non-DM command-address format block 514 receives the relevant starting address information from one of the address accumulators 512. Non-DM command-address format block 514 processes all command/address pairs not associated with data packets. By segregating non-DM and DM command decode from one another, traffic can be decoded as it naturally flows across the link. In the case of non-data movement commands interrupting or stalling data packets, such an approach provides an efficient mechanism for preserving data-movement command/address/data triplets in flight but not yet complete. As described above, the dual path approach also helps optimize logic.

DM command-address format block 516 accepts decoded command address information from CAD decoder 510. For response commands, DM command-address format block 516 receives the relevant starting address information from the address accumulator 512 of the other link processor (Received Response Address). DM command-address format block 516 processes all command/address pairs associated with data packets. As described above, such an approach optimizes logic by segregating non-DM decode from DM decode of command-address pairs. In addition, DM command-address format block 516 aligns address information, for example, on a quad-word alignment to work in conjunction with data format block 520 that performs the same function on the data. DM command-address format block 516 also increments the lower address bits to accurately reflect the decoded address as it applies to the associated quad-word data packet presented by the decode mechanism.

Multiplexer 518 selects either the non-DM CA formatted data or the DM CA formatted data as needed producing decoded command and address.

Data format block 520 is responsible for gathering packets from CAD queue 508, quad-word aligning the packets based upon the address, and generating the proper byte enables based upon the command type information obtained either directly from the decoded command or retrieved from the address accumulator.

Data accumulator 522 accumulates decoded data packets from data format block 520 in an effort to fill the entire quad-word output such that the output data is a much more readable and intuitive output for presenting to a user.

HT Specific CAD Pre-Decoder

Pre-decode information is applied to all packets irrespective of whether the packets are HT link Command, Address, or Data (CAD) packets. The relevance of the pre-decode information is utilized by CAD filter 506 and in other blocks in link processor 500.

CAD pre-decoder 502 aligns each CAD packet on a four-bit time boundary (double-word) and applies pre-decode information. The pre-decode logic identifies the following pre-decode information based upon the CAD packet information:

| Pre-decode Information | Added If: |
| --- | --- |
| Zero-NOP Packet | Entire packet is comprised of all zero's |
| Flow-Control Packet | Command type = Flow Control |
| Disconnect Packet | Disconnect bit is set and command type = FlowControl |
| Command Packet | Associated CTL bits are asserted indicating not a data packet |
| Response Packet | Command type field corresponds to one of the following: Read Response, Target Done |
| Address Store | Indicates whether address needs to be placed in Address Accumulator based upon Command Type. Applies to the following command types: Sized, Non-Posted Write or Sized Read or Broadcast with Response or Atomic-Read-Modified-Write |
| Data Move | Indicates command has associated data packet and must be processed using the Data Movement CommandAddress and Data pipes in the decoder. Applies to the following command types: Sized Write or Read Response or Atomic Read-Modified-Write |
| Command w/Address | (also referred to as command size) Indicates whether command contains an associated address packet or not. True for the following commands: Sized Write, Sized Read, Broadcast, and Atomic Read-Modified-Write |
| Byte Sized Command | Specifies whether data size is byte sized or not. True for the following: Byte-Sized Write, and Byte-Sized Read |

FIG. 6 illustrates exemplary verilog RTL code for applying command start pre-decode information to CAD packets utilizing previous pre-decode information according to an embodiment of the present invention. Note that the architecture is organized such that each CAD packet is double word sized but two CAD packets are accumulated before filtering. Hence the use of "Low" (lower double word of CAD) and "Up" (upper double word of CAD) pre-decode nomenclature.

HT Link Specific CAD Filter Block

Pre-decode of the packets is further refined in CAD filter 506 to apply specific information to the packet based upon packet type and the order in which the CAD packets are received. By applying the previously generated pre-decode information, the CAD packets can be further pre-decoded and filtered. Specifically, information indicating the start of a command packet can be added to the pre-decode information.

Based upon the pre-decode information provided by CAD pre-decoder 502, packets can be validated for further processing in the decoder. The advantage to filtering packets at this stage is packets containing stall information or zero-NOP packets can be eliminated from the stream. Because this information does not provide for any greater analysis of the HT link traffic, it is prudent to eliminate this information from the stream as early as possible to reduce possible performance bottlenecks in the decoder at later stages. FIG. 7 illustrates exemplary verilog RTL code performing the filtering mechanism according to an embodiment of the present invention.

HT Link Specific Address Accumulator

Figure 8:
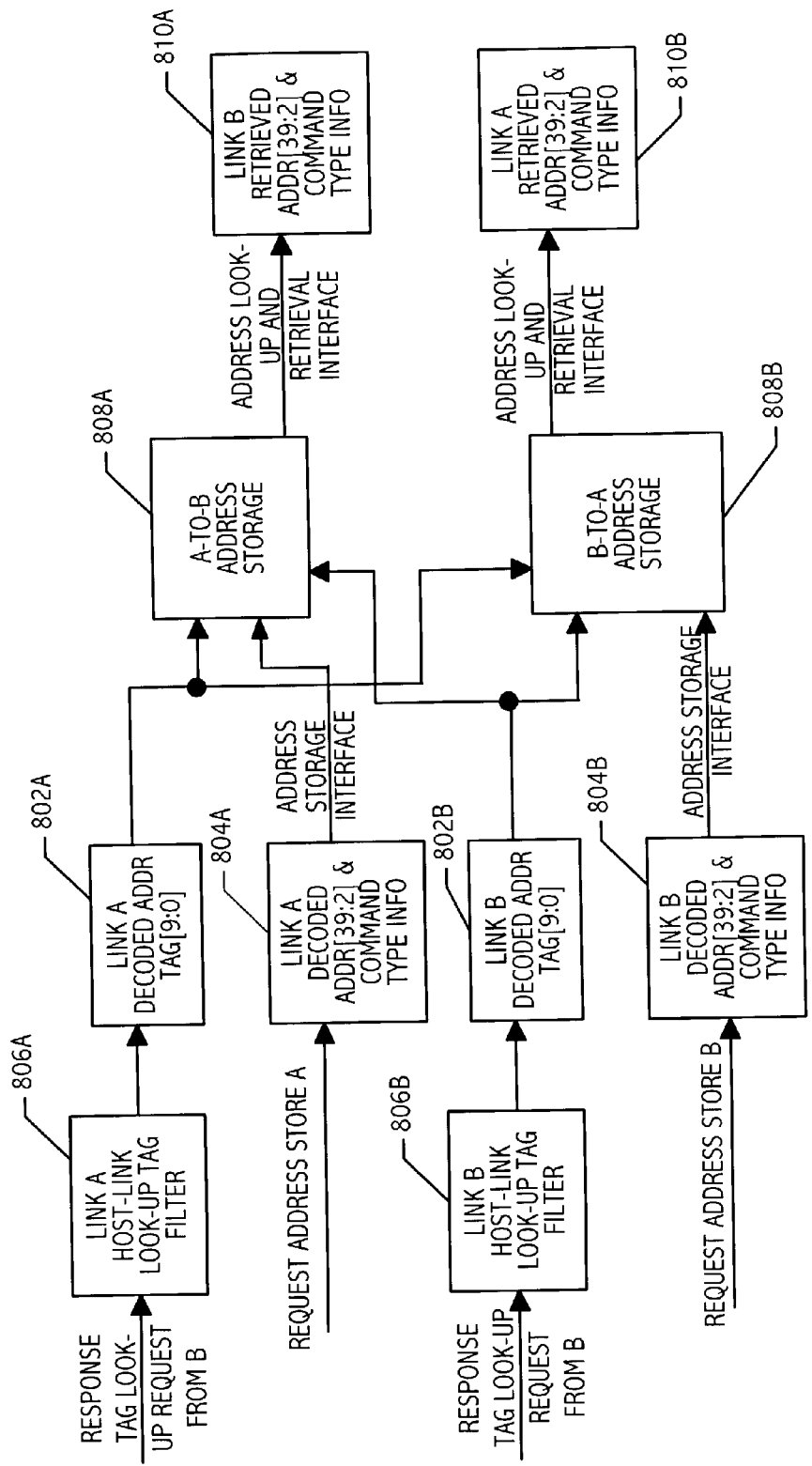
FIG. 8 illustrates an exemplary HT link specific implementation of an address accumulator according to an embodiment of the present invention.

FIG. 8 illustrates an exemplary HT link specific implementation of address accumulator according to embodiments of the present invention. Note that circuitry is duplicated as shown (including both address accumulators 512, one for each link processor 500). Thus, the following description refers to the item numbers generically, for example, reference to item 802 in the description corresponds to items 802A and 802B in the figure.

In order to provide a comprehensive decode of HyperTransport IO Link traffic, address information needs to be correlated to response data-movement commands. As specified by the HyperTransport IO-Link specification, read response and target done response commands are transmitted on an HT link in response to read request and non-posted write commands, respectively. The response commands transmitted on the link do not contain address information. Response commands are associated with an originating request utilizing the UnitID[4:0] and SrcTag[4:0] fields transmitted by in the read request packets by a link decoded address tag function 802 and a link decoded address and command type info function 804. These two fields can be combined into a unique 10-bit tag to associate read requests with responses. Using this 10-bit tag in conjunction with, for example, content-addressable memory cells, address information can be stored in address storage 808 as the result of decoding read request, non-posted write, broadcast with response, and atomic read-modify-write commands. Thus, during the decode of read response and target done commands, the address information can be retrieved from address storage 808 using the same 10-bit tag and presented as part of the display of the read response and target done.

In addition to address information, the HT link Mask/Count field in the request packet and a decoded read-byte qualifier is stored in address storage 808 to allow the decode of the response command to use the read-byte mask field to qualify the data because the mask is transmitted with the read-byte request command.

In cases where a response command flows upstream from a node to the host bridge, the UnitID-SrcTag field must be modified because the UnitID that flows upstream contains the UnitID of the target as opposed to the UnitID of the host bridge (UnitID[4:0]=5'b00000). Therefore, a host-link lookup filter function 806 sets the UnitID=5'b00000 to properly hit host-bridge initiated request address and data.

Address storage 808 is composed of, for example, eight content-addressable-memory (CAM) address cells. Based upon HT IO-link traffic patterns and available request buffers, eight address cells are sufficient to cover outstanding requests on an HT IO Link. If future architectures require the ability to track more outstanding request-response pairs, the number of CAM address cells can be increased with a minimum impact on performance.

Link retrieved address and command type info function 810 performs the retrieve of the address utilizing the 10-bit tag formed from the UnitID[4:0] and SrcTag[4:0] fields.

Figure 9:
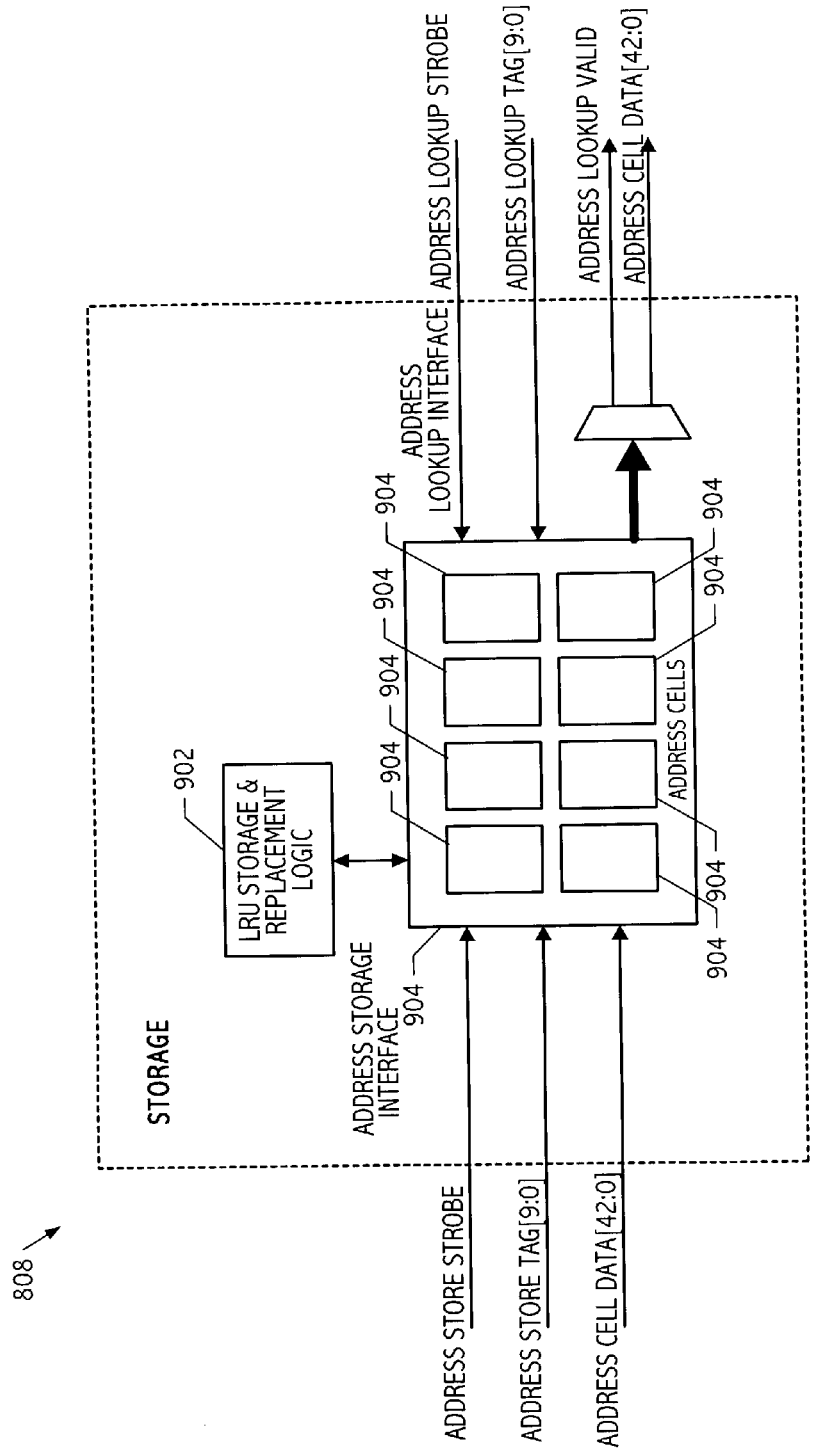
FIG. 9 illustrates a HT link specific implementation of an address storage according to an embodiment of the invention.

FIG. 9 illustrates a HT link specific implementation of address storage 808 according to an embodiment of the invention. Address cell data[42:0] includes an HT link address[39:2] field, an HT link ReadByte mask[3:0] field, and an HT link ReadByte mask qualifier field. ReadByte mask field is obtained from a byte-sized read request packet and is used for generating byte enable qualifiers. HT link ReadByte mask qualifier designates whether the request is a byte-sized read or not. If the bit is set, then the ReadByte mask field is used during decode of the response to properly set the ByteEnable data qualifier bits. The address LookUp valid qualifier indicates whether the lookup hits in the address accumulator.

A Least-Recently-Used (LRU) storage and replacement (LSR) logic 902 schedules which of eight address cells 904 will store the next valid address cell data. If one of the address cells 904 is empty, LSR logic 902 schedules the storage to occur at the empty location. If all of the address cells 904 are full, then a LRU algorithm is implemented to determine the best location to store the cell data. By using the LRU algorithm and a sufficient size address storage 808, a robust level of decoded link traffic can be maintained.

FIGS. 10A-10D illustrate exemplary verilog RTL code for each address cell 904 according to an embodiment of the present invention.

Storage Format for Storage in Trace Buffer and Download to Host PC

According to an embodiment of the invention, an efficient format for storing HT link traffic in local trace buffer 208 that is suitable for download, post-processing, and display on host PC 210 is utilized. The storage format leads to more efficient storage as well as greatly eliminates the overhead associated with software post-processing on host PC 210. Decoder 304 converts the framed link traffic into the storage format and sends it to trace buffer 306 for storage. Upon a trigger event from logic analysis function 308, trace buffer 306 stores a specified amount of traffic that is downloaded through host interface 310 to host PC 210.

The storage format is 192 bits wide and is comprised of three 64-bit components. FIGS. 11A-11C illustrate each of the three components HT link Info packet 1102, CAD A packet 1104, and CAD B packet 1106. HT link info packet 1102, illustrated in FIG. 11A, includes information such as timestamp information, sideband signal information, and address information. CAD A packet 1104 and the CAD B packet 1106, illustrated in FIGS. 11B-11C respectively, contain HT link command and data packets as transmitted on the link.

HT link info packet 1102 stores supplemental information of the decoded HT link traffic in order to provide an efficient and compact format for post-processing and displaying HT link traffic on host PC 210. HT link info packet 1102 contains time stamp information for HT link packets being stored, indicates whether the packet corresponds to a trigger condition, defines whether the stored packet is data or command, and includes command/data specific information.

Referring to FIG. 11A, HT link info packet bits [63:27] contain HT link time stamp[36:0] field. The upper bits of the time stamp (HT link time stamp[42:37] are stored in HT link info packet bits [20:13] or [7:0] if the packet is not a data packet. For data packets, only the lower 37 bits (HT link time stamp[36:0]) is stored. The advantage of such an approach is a more compact format can be created. However, associated data must follow within 37-bits of timestamp from the command packet. For example, at a clock rate of 200 MHz, a 43-bit timestamp allows for approximately 12 hours of operation before rolling over while a 37-bit time stamp provides only 12 minutes of operation. Thus, data must follow an HT link data movement command packet within 12 minutes. Such a stipulation is easily achievable and well within the norms of traffic flow on an HT link. In addition, many times while data is being transmitted on one link, no valid traffic or a command packet is being stored on the other link. Therefore, a full 43-bit timestamp will exist in almost all cases.

HT link info packet bit [26] is a trigger position field indicating whether a trigger event has occurred in relationship to the packet on either the A or B side of the link.

HT link Info packet bit [25] and [12] contain a packet definition field for the B and A packets, respectively. The packet definition field indicates whether the packet is a command or data packet. If the packet is a command packet, the packet is further qualified by the side-band only bit HT link info packet bit[23] (HT link X decode[2]). If the side-band only bit is asserted, then no command information is stored for the particular link. In such cases, only the HT link side-band signals and 42-bit timestamp are stored. The side band signals stored include HTStop_L, HTReq_L, HTReset_L, and PowerOK. If HT link X packet Def=0, then the packet is a data packet.

HT link info packet bits [24:21] and [11:8] contain a link decode field for the B and A packets, respectively. If the packet is a data packet, then the link decode field includes the lower address bits (data addr[5:2]) associated with the quad-word of data stored in the HT link CAD A and B packets 1104 and 1106. If the packet is a command packet, a sideband field (ANA, side-band only, and HTStop_L/ HT_Req_L for the B side of the link or HTReset_L/PowerOK for the A side of the link) is stored. The address-not-available bit (ANA) indicates that an associated address is not available for a response command. This field is only relevant for response commands and indicates an error condition with the decode logic in the case of a HT IO link.

HT link info packet bits [20:13] and [7:0] contain a link qualifier field for the B and A packets, respectively. If the packet is a data packet, then the link qualifier field contains the related byte enable[7:0] field used to qualify the quad-word of data stored in the HT link CAD A and B packets 1104 and 1106. If the packet is a command packet, then the time stamp[42:37] field is stored in the upper 6 bits of the link qualifier field. If the packet is a response command packet, the address bits Addr[7:6] of the HT link address is also stored. For all other commands, this field is not relevant. If the side-band only bit (HT link X decode[2]) is asserted, then this field contains additional side band signals not stored in the HT link X decode field. The side-band signals stored in this field for link A are HTStop_L and HTReq_L. For the B-side, HTReset_L and PowerOK are stored. When no valid HT link traffic exists, the side-band signals are only stored if a transition occurs. Doing so makes efficient use of the available trace buffer space.

Command packets store sideband information, address bits [7:6] (if relevant), and the upper 6 bits of the time stamp. The address bits [7:6] are stored for response addresses. In other words, HT link commands that are responses or information packets and transmit only a tag as opposed to an actual address have no place in HT link command encoding to store address bits. While the upper DW of the HT link CAD packets is available for this purpose, the 38 bit address cannot entirely be stored in the 32-bit field. As a solution, address bits[7:6] are stored in the HT link info packet and address bits[5:2] are stored with the data in CAD A or B packet 1104 or 1106. Response address bits[7:6] reflect the state of all command packets with an associated address as opposed to just response packets.

HT link CAD A and B packets 1104 and 1106 are illustrated if FIGS. 11B and 11C. HT link CAD A packet 1104 represents HT link traffic on the A-side, and HT link CAD B packet 1106 represents HT link traffic on the B-side. Both packets 1104 and 1106 are the same. Thus, only HT link CAD A packet 1104 is described.

HT link CAD A packet contains the HT link CAD packets sampled off the link. The format of the packet matches the HT IO-Link specification. Thus, software routines do not need to support two different formats. Additionally, software routines do not have to determine the start of a command packet when applying information from the HT link info packet. Either data or command-address information is stored as indicated by the link packet definition field stored in the HT link info packet.

Data (HT link upper DW data and HT link lower DW data) is always stored on quadword boundaries regardless of the transmitted boundary (HT link traffic is DW aligned). For example, if a transfer of one dword=0x1234 to address=0x04 occurs, the data is aligned to the upper DW of the QW ((HT link upper DW data[31:0]=0x1234, HT link lower DW data[31:0]=0xXXXX) and HT link info packet fields are set as follows: Data Addr[5:2] is 0x00 with the ByteEnable[7:0] equal to 0xF0. Storing the lower address bits [5:2] eliminates the need for software to post process and determine relevant interleave information.

If the packet is a command packet, up to two doublewords of information can be stored for each command. If the command involves an associated address (either transmitted as part of CAD packet, for example, in a write or read command, or implied by a tag, for example in a read response command), then address bits [38:8] are stored in the upper double word. The state of the ANA bit contained in the HT link info packet determines the validity of the address. Software decodes the command type to determine if this command packet has an associated address.

In a few rare cases, two command packets are stored in both the upper and lower DW of HT link CAD A packet 1104. The lower DW always contains an entire valid HT link command packet in a command packet. Decoding the command type of this packet determines whether an associated address is contained in the upper DW of the packet.

If an address is not stored, then software determines if a valid command packet is stored in the upper DW. If no valid command is stored in the upper DW, a NOP packet (HT link CAD X[63:32]=0x00000000) is contained in this field. Software filters out these NOP's.

For side-band only storage, HT link CAD A packet 1104 can hold additional information about the HT link traffic beyond command-address information. Suitable information such as current HT link flow-control buffer allocation, current number of outstanding requests (along with relevant tags), and HT link protocol error information can be stored. The flow-control buffer allocation represents the total number of free buffers currently on the link. The current number of outstanding requests indicates how many requests are in flight and awaiting response data. Indicating a subset of the oldest tag(s) in flight is a useful debug tool.

HT Link Specific Logic Analysis Function

Figure 12:
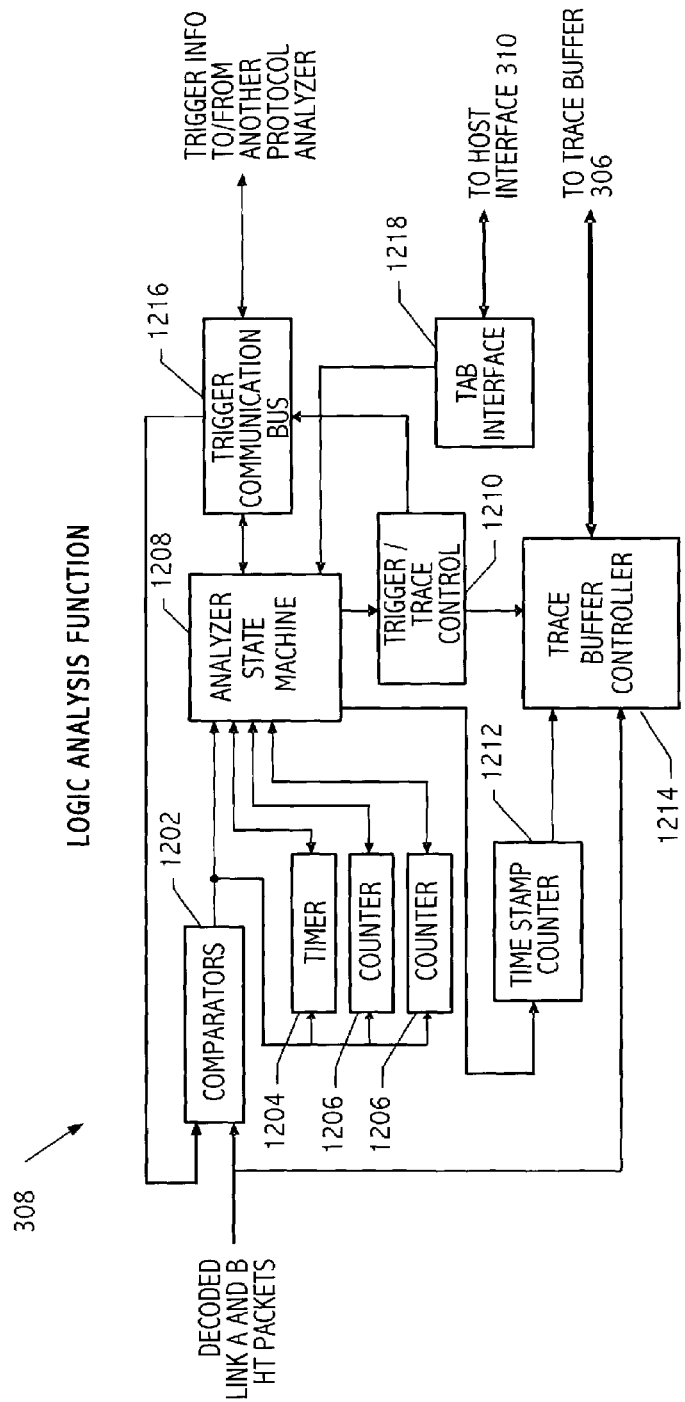
FIG. 12 illustrates an HT link specific logic analysis function according to an embodiment of the present invention.

FIG. 12 illustrates an HT link specific logic analysis function 308 according to an embodiment of the present invention. Logic analysis function 308 receives decoded packet information from decoder 304. Logic analysis function 308 contains comparators 1202, timer 1204, counters 1206, analyzer state machine 1208, trigger/trace control 1210, time stamp counter 1212, trace buffer 1214, trigger communication bus 1216 and trace acquisition board (TAB) interface 1218.

Comparators 1202 compare HT link packets and generate events used by analyzer state machine 1208, counters 1206 and timer 1204. Timer 1204 is a programmable timer used to generate an event for analyzer state machine 1208.

Counters 1206 are programmable counters used to generate events for analyzer state machine 1208. Analyzer state machine 1208 is used to setup compound trigger conditions. Trigger/trace control 1210 performs management of the triggering and trace control functions. Time stamp counter 1212 is used to correlate data stored in an external trace buffer. Trace buffer controller interfaces to external SRAM and controls the storage of HT link traffic. Trigger communication bus 1216 sends and receives trigger information to/from other protocol analyzers. This allows multiple protocol analyzers to analyze a system (multiple HT links) utilizing a common trigger condition.

Figure 13:
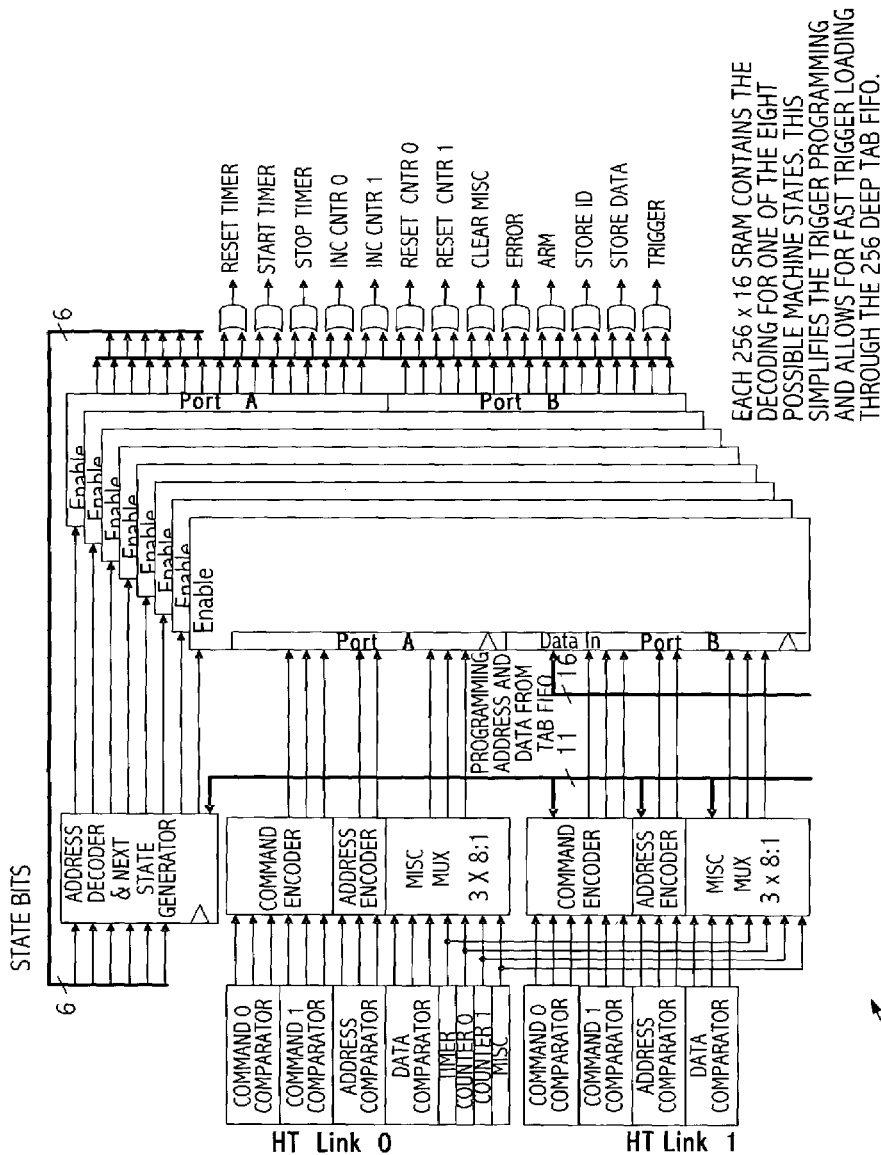
FIG. 13 illustrates an exemplary implementation of a trigger/trace control function according to an embodiment of the present invention.

Trigger/trace control 1210 decodes all events that occur, in parallel and in sequence, and compares the events against a programmed trigger requirement. If the events occur as specified, trigger/trace control 1210 asserts specific outputs including main trigger, data acquisition, timer and counter control and trigger level transitions. FIG. 13 illustrates an exemplary implementation of a trigger/trace control function according to an embodiment of the present invention.

Referring to FIG. 13, trigger/trace control 1210 can perform multiple functions. Trigger/trace control 1210 can trigger on up to, for example, 8 different HT link events (including address and data matches). Trigger/trace control 1210 can provide up to 8 trigger levels for advanced triggering modes. Trigger/trace control 1210 can trigger on flow control events. Any combination of events can start or stop up to 2 counters or timer. Trigger/trace control 1210 can trigger on requested data pattern (RdResp) read from a requested address (RdReq), i.e. read data 0x0055AA00 from address 0xAA55. Additionally, trigger/trace control 1210 can perform pre- and post-trigger data acquisition.

Triggering Format for Use by Logic Analysis Function

According to an embodiment of the present invention, an optimum triggering format suitable for logic analysis and triggering on specific events on a HT link is utilized. The triggering format includes a command field, address field, and data field. Because response packets tag information instead of addresses, the triggering function utilizes decoded packets having the address from the original request packet and data and command from the response packet. Thus, a trigger condition can be configured according to a response with a particular address.

FIG. 14A illustrates an HT link specific triggering format according to an embodiment of the present invention. The address and data fields are optional and are provided according to the command type (CMD[5:0]) contained in the command field. The command field is 31-bits, Command [30:0]. The address field is 37 bits, Address[39:2]. The data field includes 64 bits of data and 8 byte enables, Data[63:0] and Byte-Enables[7:0].

FIGS. 14B-14C illustrate the triggering format of the command field according to an embodiment of the present invention. The HT link command field has two different formats describing either an HT IO-Link command, as illustrated in FIG. 14B, or an HT link IO-Link Flow-Control command, as illustrated in FIG. 14C. When CMD[5:0] is not equal to 0x00, the packet is not an HT link flow control packet.

Referring to FIG. 14B, command[30] indicates that a valid decoded HT link command/address/data triplet is available for display/analysis. Command[29] is an address not available (ANA) bit that is asserted when decoder 304 cannot associate an address with a response command which is an error condition. Command[28] corresponds to the HT link NXA bit. Command[27] indicates that the command is attempting to travel in isochronous virtual channel. Command[26] corresponds to the HT link bridge bit. Command [25] corresponds to the HT link Compat and HT link error bits. Command[24] corresponds to the HT link PassPW bit. Command[23:20] corresponds to the HT link SeqID[3:0] field. Command[19:15] corresponds to the HT link SrcTag [4:0] field. Command[14:10] corresponds to the HT link UnitID[4:0] field. Command[9:6] corresponds to the HT link mask/count [3:0] field. Command[5:0] corresponds to the HT link Cmd[5:0] field.

FIG. 14C illustrates the format for HT link flow control packets. Note that this format includes double-word and normal flow control allocation formats and describes buffer release events for the HT link virtual channels. Each field is specified in the HT IO-Link Specification with the exception of the valid bit that indicates that a valid decoded HT link command describing a flow control packet is available for display/analysis The address field of the triggering format is a 38-bit wide field that directly corresponds to the 40-bit HT link address field (39:2) transmitted on the link. The bottom two bits of the address field are not included because the HT link data packets are double-word aligned.

The data field of the triggering format is a 64-bit wide (quad word) field that reflects data movement transfer on the link. The data is qualified by an 8-bit wide byte enable field. Data is always presented as naturally quad word aligned. Because HT link traffic is naturally double-word aligned, the data in some instances is shifted to the upper double-word of the quadword and the natural HT link address is modified to be quad-word aligned. For example, if a double-word write dword to address 0x00__0000__00024 occurs, the decoded output format will be modified as follows:

|  | Command Field | Address Field | Data Field |
| --- | --- | --- | --- |
| Original HT transmitted data | WrDword | 0x0000000024 | 0x0024 |
| Decoded HT data | WrDword | 0x0000000020 | 0x00240000, Byte Enable 0xF0 |

Although protocol intelligent logic analysis tool 200 has been described in relation to the analysis of a HyperTransport split-transaction link, the techniques described herein can beneficially be applied to any complex, split-transaction bus. Further, although protocol intelligent logic analysis tool 200 has been described in relation to the analysis of a link, the techniques herein can beneficially be applied to any split-transaction protocol implemented on a link (i.e., a point-to-point connection between two devices) or a bus (i.e., a multi-device connection) architecture.

Different portions of logic analysis tool 200, for example, main board 204 or protocol analyzer 206, can be implemented as a stand-alone product. For example, main board 204 can be supplied with an industry standard interface and connected to a traditional logic analyzer. Thus, the traditional logic analyzer can be updated to include support for a HT link or other complex, split-transaction link or bus.

Decoder 304 can be utilized as shown as a functional block of protocol analyzer 206 or utilized separately in other environments. For example, the circuitry of decoder 304 can be incorporated into any HT link device to serve as part of a HT link compliancy checker or hardware debug tool. Decoder 304 can be added to any device being developed for the HT link. Thus, integrated circuit designers and platform developers can get their products to market faster by integrating decode logic directly onto the product. Further, decoder 304 can be provided as a library component or software module, for example, in a library of functions offered by integrated circuit design tools. Thus, integrated circuit designers can decrease development time by not having to design custom decoders. Alternatively, decoder 304 can be integrated into the front-end receiver of a HT link device. Thus, the decoder 304 can be integrated into an integrated circuit running at high-speed.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A protocol analyzer comprising:
   a bus synchronizer configured to receive link traffic from a split-transaction link and frame the link traffic into a plurality of framed packets, the plurality of framed packets including a plurality of request packets and a plurality of response packets;
   a decoder configured to receive the plurality of framed packets and decode the plurality of framed packets into decoded packets, wherein at least one of the decoded packets includes information from a request packet and information from a corresponding response packet; and
   a logic analysis function configured to receive the decoded packets and initiate a trigger action on receipt of one of the decoded packets; and
   wherein the request packet includes a command, an address, and tag information, and the corresponding response packet includes data and the tag information, and wherein the at least one of the decoded packets includes the command, the address, and the data.

2. The protocol analyzer as recited in claim 1, wherein the link traffic operates in accordance with a HyperTransport link.

3. The protocol analyzer as recited in claim 1, wherein the bus synchronizer is further configured to deserialize the link traffic.

4. A protocol analyzer comprising:
   a bus synchronizer configured to receive link traffic from a split-transaction link and frame the link traffic into a plurality of framed packets, the plurality of framed packets including a plurality of request packets and a plurality of response packets;
   a decoder configured to receive the plurality of framed packets and decode the plurality of framed packets into decoded packets, wherein at least one of the decoded packets includes information from a request packet and information from a corresponding response packet; and
   a logic analysis function configured to receive the decoded packets and initiate a trigger action on receipt of one of the decoded packets; and wherein the decoder is further configured to replace a tag in the corresponding response packet with an address from the request packet to form the at least one of the decoded packets.

5. The protocol analyzer as recited in claim 1, wherein the link traffic includes a first data stream and a second data stream, and the request packet is in the first data stream and the corresponding response packet is in the second data stream.

6. The protocol analyzer as recited in claim 5, wherein each of the bus synchronizer, decoder and logic analysis functions are partitioned into two circuits, one for each data stream and the two circuits of the decoder communicate to identify related request and response packets.

7. The protocol analyzer as recited in claim 1, further comprising:
a trace buffer for storage of link traffic that has been formatted by the decoder for storage and display.

8. The protocol analyzer as recited in claim 7, further comprising a host interface configured to send the link traffic that has been formatted for storage and display to a host device for display.

9. The protocol analyzer as recited in claim 1, further comprising a host interface configured to receive configuration information from a host device, the configuration information including trigger set points.

10. A method of analyzing a bus comprising:
receiving and framing link traffic from a split-transaction link into a plurality of framed packets, the plurality of framed packets including a plurality of request packets and a plurality of response packets;
decoding the plurality of framed packets into decoded packets, wherein at least one of the decoded packets includes information from a request packet and information from a corresponding response packet, wherein the decoding further comprises replacing a tag in the corresponding response packet with an address from the request packet to form the at least one of the decoded packets; and
analyzing the decoded packets and initiating a trigger action on receipt of one of the decoded packets.

11. The method as recited in claim 10, wherein the link traffic operates in accordance with a HyperTransport link.

12. The method as recited in claim 10, further comprising deserializing the link traffic.

13. A method of analyzing a bus comprising:
receiving and framing link traffic from a split-transaction link into a plurality of framed packets, the plurality of framed packets including a plurality of request packets and a plurality of response packets;
decoding the plurality of framed packets into decoded packets, wherein at least one of the decoded packets includes information from a request packet and information from a corresponding response packet; and
analyzing the decoded packets and initiating a trigger action on receipt of one of the decoded packets; and
wherein the request packet includes a command, an address, and tag information, and the corresponding response packet includes data and the tag information, and wherein the at least one of the decoded packets includes the command, the address, and the data.

14. The method as recited in claim 10, wherein the link traffic includes a first data stream and a second data stream, and the request packet is in the first data stream and the corresponding response packet is in the second data stream.

15. A method of designing an integrated circuit comprising:
receiving link traffic over a split-transaction link from a device;
framing the link traffic into a plurality of framed packets, the plurality of framed packets including a plurality of request packets and a plurality of response packets;
decoding the plurality of framed packets into decoded packets, wherein at least one of the decoded packets includes information from a request packet and information from a corresponding response packet;
analyzing the decoded packets and initiating a trigger action on receipt of one of the decoded packets; and
identifying and correcting design errors in the device; and
wherein the request packet includes a command, an address, and tag information, and the corresponding response packet includes data and the tag information, and wherein the at least one of the decoded packets includes the command, the address, and the data.

16. The method as recited in claim 15, further comprising deserializing the link traffic.

17. The method as recited in claim 15, wherein the decoding further comprises replacing a tag in the corresponding response packet with an address from the request packet to form the at least one of the decoded packets.

18. The method as recited in claim 15, wherein the link traffic includes a first data stream and a second data stream, and the request packet is in the first data stream and the corresponding response packet is in the second data stream.

19. The device designed by the method of claim 15.

20. A computer program product comprising:
a computer readable media embedded with a set of instructions, the set of instructions executed by a computer and configured to:
receive and frame link traffic from a split-transaction link into a plurality of framed packets, the plurality of framed packets including a plurality of request packets and a plurality of response packets;
decode the plurality of framed packets into decoded packets, wherein at least one of the decoded packets includes information from a request packet and information from a corresponding response packet; and
analyze the decoded packets and initiating a trigger action on receipt of one of the decoded packets; and
wherein the request packet includes a command, an address, and tag information, and the corresponding response packet includes data and the tag information, and wherein the at least one of the decoded packets includes the command, the address, and the data.

21. The computer program product as recited in claim 20, the set of instructions further configured to deserialize the link traffic.

22. The computer program product as recited in claim 20, wherein the set of instructions to decode are configured to replace a tag in the corresponding response packet with an address from the request packet to form the at least one of the decoded packets.

23. The computer program product as recited in claim 20, wherein the link traffic includes a first data stream and a second data stream, and the request packet is in the first data stream and the corresponding response packet is in the second data stream.

24. An apparatus comprising:
means for receiving and framing link traffic from a split-transaction link into a plurality of framed packets, the plurality of framed packets including a plurality of request packets and a plurality of response packets;

means for decoding the plurality of framed packets into decoded packets, wherein at least one of the decoded packets includes information from a request packet and information from a corresponding response packet; and means for analyzing the decoded packets and initiating a trigger action on receipt of one of the decoded packets; and wherein the request packet includes a command, an address, and tag information, and the corresponding response packet includes data and the tag information, and wherein the at least one of the decoded packets includes the command, the address, and the data.

25. The apparatus as recited in claim 24, further comprising means for deserializing the link traffic.

26. The apparatus as recited in claim 24, wherein the means for decoding further comprises means for replacing a tag in the corresponding response packet with an address from the request packet to form the at least one of the decoded packets.

27. The apparatus as recited in claim 24, wherein the link traffic includes a first data stream and a second data stream, and the request packet is in the first data stream and the corresponding response packet is in the second data stream.

28. The protocol analyzer as recited in claim 1, further comprising a first and a second decode path corresponding to non-data movement commands and data movement commands, respectively.

* * * * *